(12) United States Patent
Yamanoue et al.

(10) Patent No.: US 11,292,155 B2
(45) Date of Patent: Apr. 5, 2022

(54) POLY(PHENYLENE SULFIDE) RESIN COMPOSITION, PRODUCTION METHOD THEREFOR, AND MOLDED ARTICLE

(71) Applicant: Toray Industries, Inc., Tokyo (JP)

(72) Inventors: Hisashi Yamanoue, Nagoya (JP); Gen Noguchi, Nagoya (JP); Kei Saito, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 488 days.

(21) Appl. No.: 16/348,975

(22) PCT Filed: Mar. 16, 2018

(86) PCT No.: PCT/JP2018/010456
§ 371 (c)(1),
(2) Date: May 10, 2019

(87) PCT Pub. No.: WO2018/180591
PCT Pub. Date: Oct. 4, 2018

(65) Prior Publication Data
US 2019/0270886 A1  Sep. 5, 2019

(30) Foreign Application Priority Data

Mar. 30, 2017 (JP) .............................. JP2017-066850
Jan. 5, 2018 (JP) .............................. JP2018-000398

(51) Int. Cl.
| | | |
|---|---|---|
| C08L 81/02 | (2006.01) |
| B29B 7/00 | (2006.01) |
| B29C 48/00 | (2019.01) |
| B29B 7/90 | (2006.01) |
| C08G 75/0209 | (2016.01) |
| C08J 3/20 | (2006.01) |
| C08K 3/40 | (2006.01) |
| C08K 5/544 | (2006.01) |
| C08K 7/14 | (2006.01) |
| C08K 9/04 | (2006.01) |
| C08K 13/02 | (2006.01) |
| B29C 70/02 | (2006.01) |
| C08G 75/0286 | (2016.01) |
| B29B 7/86 | (2006.01) |
| C08K 9/08 | (2006.01) |
| B29K 81/00 | (2006.01) |
| B29K 309/08 | (2006.01) |
| E03C 1/02 | (2006.01) |
| B29B 7/84 | (2006.01) |
| B29B 7/46 | (2006.01) |

(52) U.S. Cl.
CPC .............. *B29B 7/007* (2013.01); *B29B 7/86* (2013.01); *B29B 7/90* (2013.01); *B29C 48/022* (2019.02); *B29C 70/02* (2013.01); *C08G 75/0209* (2013.01); *C08G 75/0286* (2013.01); *C08J 3/20* (2013.01); *C08J 3/201* (2013.01); *C08K 3/40* (2013.01); *C08K 5/544* (2013.01); *C08K 7/14* (2013.01); *C08K 9/04* (2013.01); *C08K 9/08* (2013.01); *C08K 13/02* (2013.01); *C08L 81/02* (2013.01); *B29B 7/46* (2013.01); *B29B 7/845* (2013.01); *B29K 2081/04* (2013.01); *B29K 2309/08* (2013.01); *E03C 1/02* (2013.01)

(58) Field of Classification Search
CPC .. C08G 75/0209; C08G 75/0286; C08K 3/40; C08K 5/544; C08K 7/14; C08K 9/04; C08K 9/08; C08K 13/02; C08J 3/20; C08J 5/043; C08J 5/10; C08J 2381/04; B29K 2081/04; B29K 2309/08; E03C 1/02; C08L 81/04; B29C 70/02
USPC .......................................................... 523/206
See application file for complete search history.

(56) References Cited

U.S. PATENT DOCUMENTS

| | | | |
|---|---|---|---|
| 4,917,957 A | 4/1990 | Notoh et al. | |
| 4,935,473 A * | 6/1990 | Fukuda .............. | C08G 75/0245 525/537 |
| 6,409,951 B1 * | 6/2002 | Inoue .................. | C04B 20/1037 106/690 |
| 10,370,522 B2 * | 8/2019 | Peng .................. | B29C 45/14008 |
| 10,577,501 B2 * | 3/2020 | Yamanaka .............. | C08L 23/02 |
| 2010/0249342 A1 | 9/2010 | Unohara et al. | |
| 2014/0343215 A1 * | 11/2014 | Ouchiyama ............. | C08L 81/04 524/500 |

(Continued)

FOREIGN PATENT DOCUMENTS

| | | |
|---|---|---|
| CN | 1031847 | 3/1989 |
| CN | 101910251 | 12/2010 |
| JP | 57-070157 | 4/1982 |

(Continued)

OTHER PUBLICATIONS

Office Action dated Apr. 12, 2021, of counterpart Chinese Application No. 201880010151.

Primary Examiner — Hannah J Pak
(74) Attorney, Agent, or Firm — DLA Piper LLP (US)

(57) ABSTRACT

A polyphenylene sulfide resin composition includes (A) 100 parts by weight of an acid-treated polyphenylene sulfide resin, (B) 10 to 100 parts by weight of a glass fiber, and (C) 0.1 to 10 parts by weight of an amino group-containing alkoxysilane compound, wherein the polyphenylene sulfide resin composition has an exothermic peak temperature (Tmc) of 195° C. to 225° C., the exothermic peak temperature being observed during a crystallization caused when the polyphenylene sulfide resin composition is melted by heating to 340° C. and then cooled at a rate of 20° C./minute, using a differential scanning calorimeter.

9 Claims, No Drawings

(56) References Cited

U.S. PATENT DOCUMENTS

2014/0356630 A1   12/2014   Ouchiyama

FOREIGN PATENT DOCUMENTS

| JP | 64-038211 | 2/1989 |
| JP | 05-320342 | 12/1993 |
| JP | 06-256517 | 9/1994 |
| JP | 07-003158 | 1/1995 |
| JP | 08-283576 A | 10/1996 |
| JP | 09-132711 | 5/1997 |
| JP | 2002-285009 | 10/2002 |
| JP | 2006-045451 | 2/2006 |
| JP | 2009-138039 | 6/2009 |
| JP | 2014-065841 | 4/2014 |
| JP | 2016-145323 | 8/2016 |
| WO | 2013/080566 A1 | 6/2013 |

\* cited by examiner

POLY(PHENYLENE SULFIDE) RESIN COMPOSITION, PRODUCTION METHOD THEREFOR, AND MOLDED ARTICLE

TECHNICAL FIELD

This disclosure relates to a polyphenylene sulfide resin composition having excellent water pressure cracking strength, more particularly, to a molded article, water plumbing among others, that has excellent water pressure cracking strength.

BACKGROUND

Polyphenylene sulfide resins (hereinafter, may be referred to as PPS resins for short) belong to super engineering plastics having high heat resistance, have excellent mechanical strength, stiffness, flame retardance, chemical resistance, electrical characteristics, and dimensional stability and, consequently, are widely used in applications such as various electrical and electronic parts, home electrical appliance parts, automobile parts, and mechanical parts.

On the other hand, water plumbing parts such as housing equipment piping parts and water heater piping parts used with water passing through the parts, are conventionally mainly made of metal, but have a higher specific gravity, a poorer processability, and a lower degree of freedom of shaping, and there has thus occurred a demand for a resin material that can be substituted for such metal parts.

JP 06-256517 A describes a method in which an alkoxysilane compound is added to a polyphenylene sulfide resin for the purposes of enhancing the toughness and mechanical characteristics of the polyphenylene sulfide resin and suppressing the generation of flashes in injection molding.

JP 2006-45451 A proposes a method in which an alkoxysilane compound having an amino in the functional group is added to a PPS resin.

Water plumbing composed of a PPS resin composition is exposed to flowing hot-water and exposed to a large hydraulic pressure similar to the direct supply pressure of tap water or to a large hydraulic pressure caused by water hammer and, as a result, essentially needs enhanced water pressure cracking strength. However, conventional molded articles composed of a PPS resin composition insufficiently have such characteristics and, accordingly, are used in limited water plumbing applications. Furthermore, water plumbing has parts that come in contact with drinking water and, accordingly, materials containing a component that causes health hazards to humans are only used in limited water plumbing applications.

A PPS resin composition disclosed in JP 06-256517 A provides a molded article strength enhanced to a certain degree by addition of an epoxysilane compound, but is still inadequate to be used at portions which are exposed to flowing hot-water and a high hydraulic pressure. Furthermore, some alkoxysilane compounds containing an epoxy group are suspected of causing cancer, and pose a problem in that, from a safety viewpoint, there are limitations to the application of such compounds to water plumbing that comes in contact with drinking water. For example, in France, materials that conform with ACS: Attestation de Conformité Sanitaire (a ministerial ordinance of the French Ministry of Social Affairs and Health) have to be used for water supply materials and equipment, and suppliers dealing in raw materials and products to be used in contact with drinking water must comply with the ordinance, and there is a problem in that alkoxysilane compounds containing an epoxy group are not registered in the positive list prescribed in ACS and, accordingly, materials containing these compounds cannot be accredited by ACS.

For a PPS resin composition disclosed in JP 2006-45451 A, a method in which an alkoxysilane compound having an amino in the functional group is added is proposed, but the reaction between PPS and alkoxysilane is insufficient in melt kneading, and fails to afford a sufficient effect.

SUMMARY

We thus provide:

(1) A polyphenylene sulfide resin composition, including: (A) 100 parts by weight of an acid-treated polyphenylene sulfide resin, (B) 10 to 100 parts by weight of a glass fiber, and (C) 0.1 to 10 parts by weight of an amino group-containing alkoxysilane compound; wherein the polyphenylene sulfide resin composition has an exothermic peak temperature (Tmc) of 195° C. to 225° C., the exothermic peak temperature being observed during a crystallization caused when the polyphenylene sulfide resin composition is melted by heating to 340° C. and then cooled at a rate of 20° C./minute, using a differential scanning calorimeter.

(2) The polyphenylene sulfide resin composition according to (1), wherein a surface treating agent for (B) the glass fiber contains an o-cresol novolac epoxy resin and a bisphenol A epoxy resin.

(3) The polyphenylene sulfide resin composition according to (1) or (2), wherein (C) the amino group-containing alkoxysilane compound is γ-aminopropyltriethoxysilane.

(4) A method of producing the polyphenylene sulfide resin composition according to any one of (1) to (3), wherein a melt kneading energy E (kWh/kg) represented by Equation (1) is 0.1 kWh/kg to 0.5 kWh/kg, wherein the melt kneading energy is used in melt-kneading the polyphenylene sulfide resin composition using a twin screw extruder having a screw length L (mm) and a screw diameter D (mm), the ratio of L/D being 10 or more; and wherein the temperature of the resin composition at the outlet of a die of the twin screw extruder is more than 340° C. and 430° C. or less.

$$E=\{(A/B)\times C\}/F \quad (1)$$

wherein A represents a screw rotational speed (rpm) of the twin screw extruder during melt kneading; B represents the maximum screw rotational speed (rpm) of the twin screw extruder; C represents a screw driving motor output (kW) during melt kneading; and F represents an extrusion rate (kg/h) of the melted resin during melt kneading.

(5) The method of producing the polyphenylene sulfide resin composition according to (4), wherein the temperature of the resin at the outlet of the die of the twin screw extruder is more than 380° C. and 430° C. or less.

(6) The method of producing the polyphenylene sulfide resin composition according to (4) or (5), the method including: pre-blending 1 to 20 parts by weight out of the 100 parts by weight of (A) the acid-treated polyphenylene sulfide resin and 0.1 to 10 parts by weight of (C) the amino group-containing alkoxysilane compound to form (D) an alkoxysilane compound pre-blended mixture, and supplying the extruder with (D) separately from the remaining 99 to 80 parts by weight of (A) the acid-treated polyphenylene sulfide resin.

(7) A molded article including the polyphenylene sulfide resin composition according to any one of (1) to (3).

(8) The molded article according to (7), wherein the molded article is any water plumbing part selected from toilet heater related parts, water heater related parts, bath related parts, pump related parts, and water meter related parts.

(9) The molded article according to (8), wherein the water plumbing part conforms to the Regulation of Attestation de Conformité Sanitaire (ACS) of France.

We thus provide a polyphenylene sulfide resin composition and a molded article composed of the composition, wherein the composition is obtained by addition of an amino group-containing alkoxysilane and a glass fiber in a specific range and further by control of Tmc to 195° C. to 225° C.; wherein the composition thus obtained enhances the strength, particularly water pressure cracking strength, of the molded article, and is applicable to water plumbing parts to be exposed to the direct supply pressure of tap water or an internal hydraulic pressure caused by water hammer, for which water plumbing parts, conventional polyphenylene sulfide resins are difficult to use; and wherein the composition has less hazardousness to the human body.

DETAILED DESCRIPTION

Below, examples will be described in detail.

An acid-treated PPS resin (A) is a polymer having a repeating unit represented by structural formula (I).

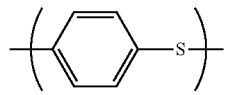
(I)

From a heat resistance viewpoint, the polymer preferably contains 70% by mole or more, even 90% by mole or more, of a polymer containing a repeating unit represented by the above-mentioned structural formula. In addition, about less than 30% by mole of the repeating units of the PPS resin may be composed of a repeating unit and the like having the following structure.

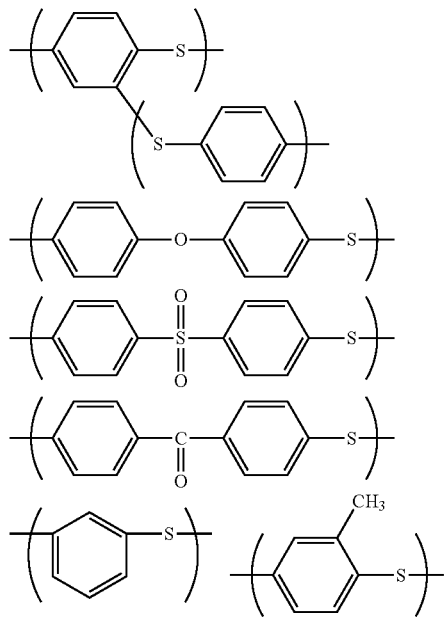

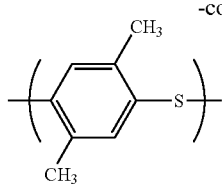

Below, a method of producing a PPS resin will be described. First, the details of a polyhalogenated aromatic compound, a sulfidizing agent, a polymerization solvent, a molecular weight modifier, a polymerization auxiliary agent, and a polymerization stabilizer to be used will be described.

Polyhalogenated Aromatic Compound

A polyhalogenated aromatic compound refers to a compound having two or more halogen atoms in one molecule. Specific examples of polyhalogenated aromatic compounds include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene, and p-dichlorobenzene is preferably used. In addition, two or more different polyhalogenated aromatic compounds can be combined to form a copolymer, and the copolymer preferably contains a p-dihalogenated aromatic compound as a main component.

In the light of obtaining a PPS resin having a viscosity suitable for processing, the amount of a polyhalogenated aromatic compound to be used is, for example, 0.9 to 2.0 mol, preferably 0.95 to 1.5 mol, more preferably 1.005 to 1.2 mol, per mole of a sulfidizing agent.

Sulfidizing Agent

Examples of sulfidizing agents include alkali metal sulfides, alkali metal hydrosulfides, and hydrogen sulfide.

Specific examples of alkali metal sulfides include lithium sulfide, sodium sulfide, potassium sulfide, rubidium sulfide, cesium sulfide, and mixtures of two or more thereof, and, among others, sodium sulfide is preferably used. These alkali metal sulfides can be used in the form of a hydrate or an aqueous mixture, or in the form of an anhydride.

Specific examples of alkali metal hydrosulfides include sodium hydrosulfide, potassium hydrosulfide, lithium hydro sulfide, rubidium hydro sulfide, cesium hydrosulfide, and mixtures of two or more thereof, and, among others, sodium hydrosulfide is preferably used. These alkali metal hydrosulfides can be used in the form of a hydrate or an aqueous mixture, or in the form of an anhydride.

A sulfidizing agent prepared in situ from an alkali metal hydrosulfide and an alkali metal hydroxide in a reaction system can also be used. Alternatively, a sulfidizing agent prepared from an alkali metal hydrosulfide and an alkali metal hydroxide and transferred to a polymerization vessel can be used.

Alternatively, a sulfidizing agent prepared in situ from hydrogen sulfide and an alkali metal hydroxide such as lithium hydroxide and sodium hydroxide in a reaction system can be used. Alternatively, a sulfidizing agent prepared from hydrogen sulfide and an alkali metal hydroxide such as lithium hydroxide and sodium hydroxide and transferred to a polymerization vessel can be used.

When part of a sulfidizing agent is lost through a dehydration operation or the like before the start of polymerization reaction, the charged amount of the sulfidizing agent means the remaining amount obtained by subtracting the lost amount from the actual charged amount.

In this regard, a sulfidizing agent can be used together with an alkali metal hydroxide and/or an alkaline earth metal hydroxide. Specific examples of preferable alkali metal hydroxides include sodium hydroxide, potassium hydroxide, lithium hydroxide, rubidium hydroxide, cesium hydroxide, and mixtures of two or more thereof. Specific examples of alkaline earth metal hydroxides include calcium hydroxide, strontium hydroxide, and barium hydroxide, and, among others, sodium hydroxide is preferably used.

An alkali metal hydrosulfide used as a sulfidizing agent is particularly preferably used together with an alkali metal hydroxide at the same time, and the amount of this hydroxide to be used is, for example, 0.95 to 1.20 mol, preferably 1.00 to 1.15 mol, more preferably 1.005 to 1.100 mol, with respect to 1 mol of the alkali metal hydrosulfide.

Polymerization Solvent

As a polymerization solvent, an organic polar solvent is preferably used. Specific examples thereof include: N-alkylpyrrolidones such as N-methyl-2-pyrrolidone and N-ethyl-2-pyrrolidone; caprolactams such as N-methyl-$\varepsilon$-caprolactam; aprotic organic solvents represented by 1,3-dimethyl-2-imidazolidinone, N,N,-dimethylacetamide, N,N-dimethylformamide, hexamethylphosphoric triamide, dimethyl sulfone, tetramethylene sulfoxide and the like; and mixtures thereof. All of these are preferably used because of their high reaction stability. Among these, N-methyl-2-pyrrolidone (hereinafter, may be referred to as NMP for short) in particular is preferably used.

The amount of an organic polar solvent to be used is 2.0 mol to 10 mol, preferably 2.25 to 6.0 mol, more preferably 2.5 to 5.5 mol, with respect to 1 mol of a sulfidizing agent.

Molecular Weight Modifier

A monohalogen compound (that does not necessarily have to be an aromatic compound) can be used together with the above-mentioned polyhalogenated aromatic compound for the purposes of forming an end of a PPS resin to be produced or regulating the polymerization reaction and the molecular weight, or for other purposes.

Polymerization Auxiliary Agent

Preferably, a polymerization auxiliary agent is used to obtain a PPS resin having a relatively higher polymerization degree in a short time. A polymerization auxiliary agent means a substance having an action that increases the viscosity of a PPS resin to be obtained. Specific examples of such polymerization auxiliary agents include organic carboxylates, water, alkali metal chlorides, organic sulfonates, alkali metal sulfates, alkaline earth metal oxides, alkali metal phosphates, alkaline earth metal phosphates and the like. These can be used singly or in combination of two or more kinds thereof. Among others, organic carboxylates and/or water are/is preferably used.

The above-mentioned alkali metal carboxylate is a compound represented by the general formula $R(COOM)_n$ (wherein R is a $C_1$-$C_{20}$ alkyl group, cycloalkyl group, aryl group, alkylaryl group, or arylalkyl group; M is an alkali metal selected from lithium, sodium, potassium, rubidium, and cesium; and n is an integer of 1 to 3). The alkali metal carboxylate can be used also as a hydrate, an anhydride, or an aqueous solution. Specific examples of alkali metal carboxylates include lithium acetate, sodium acetate, potassium acetate, sodium propionate, lithium valerate, sodium benzoate, sodium phenylacetate, p-potassium toluate, and mixtures thereof.

An alkali metal carboxylate may be formed by allowing an about equal chemical equivalent each of an organic acid and one or more added compounds to react, wherein the compound(s) is/are selected from the group consisting of alkali metal hydroxides, alkali metal carbonates, and alkali metal bicarbonates. Among the above-mentioned alkali metal carboxylates, lithium salts have a higher solubility in a reaction system and a larger auxiliary effect but are expensive, and potassium salts, rubidium salts, and cesium salts have an insufficient solubility in a reaction system. Accordingly, sodium acetate, which is inexpensive and has a suitable solubility in a polymerization system, is most preferably used.

When a polymerization auxiliary agent such as these is used, the amount to be used is usually 0.01 mol to 0.7 mol with respect to 1 mol of the charged alkali metal sulfide, and in the light of obtaining a higher polymerization degree, preferably 0.1 to 0.6 mol, more preferably 0.2 to 0.5 mol.

In addition, using water as a polymerization auxiliary agent is one of the effective means in the light of obtaining a resin composition having a high degree of balance between flowability and high toughness. In this example, the amount of water to be added is usually 0.5 mol to 15 mol with respect to 1 mole of the charged alkali metal sulfide, and in the light of obtaining a higher polymerization degree, preferably 0.6 to 10 mol, more preferably 1 to 5 mol.

The timing of adding these polymerization auxiliary agents is not particularly specified, and the polymerization auxiliary agent may be added at the time of the preliminary process, the initiation of polymerization, or during the polymerization, which will be described later. The polymerization auxiliary agent may also be added in plural portions, and when using an alkali metal carboxylate as a polymerization auxiliary agent, the simultaneous addition at the start of the preliminary process or at the start of the polymerization is more preferred from an easy addition viewpoint. When water is used as a polymerization auxiliary agent, it is effective to add water during a polymerization reaction after a polyhalogenated aromatic compound is charged.

Polymerization Stabilizer

A polymerization stabilizer can also be used to stabilize a polymerization reaction system and prevent side reaction. A polymerization stabilizer contributes to stabilization of a polymerization reaction system and suppresses undesired side reaction. One of the indications of side reaction is generation of thiophenol, and addition of a polymerization stabilizer can suppress the generation of thiophenol. Specific examples of polymerization stabilizers include compounds such as alkali metal hydroxides, alkali metal carbonates, alkaline earth metal hydroxide, and alkaline earth metal carbonates. Among these, alkali metal hydroxides such as sodium hydroxide, potassium hydroxide, and lithium hydroxide are preferable. Each of the above-mentioned alkali metal carboxylates acts as a polymerization stabilizer and, accordingly, is regarded as one of the polymerization stabilizers. It was earlier mentioned that an alkali metal hydrosulfide used as a sulfidizing agent is particularly preferably used together with an alkali metal hydroxide at the same time and, in this example, an alkali metal hydroxide excessively used with respect to the sulfidizing agent can be a polymerization stabilizer.

These polymerization stabilizers can be used singly or in combination of two or more kinds thereof. The polymerization stabilizer is preferably usually used in an amount of 0.02 to 0.2 mol, preferably 0.03 to 0.1 mol, more preferably 0.04 to 0.09 mol, with respect to 1 mol of the charged alkali metal sulfide. As this amount, a low value causes an insufficient stabilizing effect, and contrarily, too large a value brings an economical disadvantage and tends to reduce a polymer yield.

The timing of adding a polymerization stabilizer is not particularly specified, and the polymerization stabilizer may be added at the time of the preliminary process, the initiation of polymerization, or during the polymerization, which will be described later. The polymerization stabilizer may also be added in plural portions, and a simultaneous addition at the start of the preliminary process or at the start of the polymerization is more preferred.

Next, a preliminary process, a polymerization reaction process, and a collection process will be specifically described sequentially.

Preliminary Process

A sulfidizing agent is usually used in the form of a hydrate, and it is preferable that a mixture containing an organic polar solvent and a sulfidizing agent is heated before adding a polyhalogenated aromatic compound and thereby an excessive amount of water is removed out of a system. If this operation results in removing too much water, it is preferable to cover the shortfall by adding the shortfall amount of water.

As above-mentioned, it is also possible to use a sulfidizing agent that is prepared from an alkali metal hydrosulfide and an alkali metal hydroxide in situ in a reaction system or in a vessel different from a polymerization vessel. This method is not limited to a particular one, and is preferably, for example, a method in which an alkali metal hydrosulfide and an alkali metal hydroxide are added to an organic polar solvent under an inert gas atmosphere in a temperature of room temperature to 150° C., preferably room temperature to 100° C., and the resulting mixture is heated to at least 150° C. or more, preferably 180 to 245° C., at normal pressure or reduced pressure to evaporate water. At this stage, a polymerization auxiliary agent may be added. In addition, the reaction may be carried out with toluene or the like added in order to promote the evaporation of water.

In the polymerization reaction, the amount of water in a polymerization system is preferably 0.5 to 10.0 mol with respect to 1 mol of the charged sulfidizing agent. The amount of water in a polymerization system is an amount obtained by subtracting the amount of water removed out of the polymerization system from the amount of water charged into the polymerization system. The charged water may be in any form such as water, an aqueous solution, or crystal water.

Polymerization Reaction Process

It is preferable to produce a PPS resin powder and granular material by allowing a sulfidizing agent and a polyhalogenated aromatic compound to react in an organic polar solvent at a temperature of 200° C. to less than 290° C.

In starting a polymerization reaction process, it is desirable to add a sulfidizing agent and a polyhalogenated aromatic compound to an organic polar solvent under an inert gas atmosphere at a temperature of room temperature to 215° C., preferably 100 to 215° C. At this stage, a polymerization auxiliary agent may be added. The order of charging of these raw materials may be random or simultaneous.

Such a mixture is usually heated to 200° C. to 290° C. The heating rate is not limited to a particular value. A rate of 0.01 to 5° C./minute is usually selected, and 0.1 to 3° C./minute is more preferable.

In general, the mixture is heated finally to a temperature of 250 to 290° C. and allowed to react at the temperature usually for 0.25 to 50 hours, preferably for 0.5 to 20 hours.

A method in which the mixture is allowed to react at, for example, 200° C. to 245° C. for a given period of time in a stage prior to the stage for reaching the final temperature, and then heated to 270 to 290° C. is effective to obtain a higher polymerization degree. In this example, the reaction time at 200° C. to 245° C. is selected from usually 0.25 hours to 20 hours, preferably 0.25 to 10 hours.

To obtain a polymer having a higher polymerization degree, it is effective that the polymerization is performed in a plurality of stages. When the polymerization is carried out in a plurality of stages, the moment when the conversion rate of the polyhalogenated aromatic compound in the system at 245° C. reaches 40% by mole or more, preferably 60% by mole, is effective.

Collection Process

In a method of producing a PPS resin, solids are collected from polymerization reactants containing a polymer, a solvent and the like after the termination of polymerization. As a collection method, any known method may be adopted.

For example, a method in which particulate polymers are collected through slow cooling after the termination of polymerization reaction may be used. In this example, the slow cooling rate is not limited to a particular value, and is usually about 0.1° C./minute to 3° C./minute. Slow cooling does not have to be carried out at the same rate throughout a slow cooling process, and a method that may be adopted is, for example, such that slow cooling is carried out at a rate of 0.1 to 1° C./minute until crystallization and precipitation of polymer particles and thereafter at a rate of 1° C./minute or more.

In addition, the above-mentioned collection method carried out under rapid cooling conditions is one of the preferable methods, and a preferable example of the collection method is a flush method. A flush method is a method in which polymerization reactants in a high-temperature and high-pressure state (usually 250° C. or more, 8 kg/cm$^2$ or more) is flushed into a normal pressure or reduced pressure atmosphere, and the polymers are formed into powder form and collected at the same time as the solvent is collected. The flush means allowing polymerization reactants to spout out of a nozzle. Specific examples of atmospheres under which flushing is carried out include normal pressure nitrogen and water vapor, and the temperature is usually 150° C. to 250° C.

The flush method allows solids to be collected at the same time as a solvent is collected, allows the collection time to be relatively short, and hence is an excellent collection method that is economically efficient. In this collection method, an ionic compound represented by Na and an organic low polymerization degree substance (oligomer) tends to be taken in a polymer in the solidification process.

Post-Treatment Process

It is important that the PPS resin is obtained by acid-treating a PPS resin obtained through, for example, the above-mentioned polymerization reaction process and collection process.

An acid used for acid treatment is not limited to a particular one as long as the acid does not have an effect of decomposing a PPS resin, and examples of such acids include acetic acid, hydrochloric acid, sulfuric acid, phosphoric acid, silic acid, carbonic acid, and propyl acid. Among others, acetic acid and hydrochloric acid are more preferably used, but an acid that decomposes and degrades a PPS resin, such as nitric acid, is not preferable.

Water used for an aqueous solution of an acid is preferably distilled water or deionized water. The aqueous solution of an acid preferably has pH 1 to 7, more preferably pH 2 to 4. A pH of more than 7 increases the metal content of the PPS resin and, accordingly, is not preferable. A pH of less than 1 increases the volatile component content of the PPS resin, and, accordingly, is not preferable.

In a method of acid treatment, a PPS resin is preferably dipped in an acid or an aqueous solution of an acid, and can be suitably stirred and heated, if necessary. A temperature for heating is preferably 80 to 250° C., more preferably 120 to 200° C., still more preferably 150 to 200° C. Less than 80° C. causes the acid treatment effect to be small and increases the metal content, and more than 250° C. causes the pressure to be too high and, accordingly, is not preferable from a safety viewpoint. In addition, the pH achieved by dipping a PPS resin in an aqueous solution of an acid is preferably 8 or less, more preferably pH 2 to 8, as a result of the acid treatment. A pH of more than 8 increases the metal content of the obtained PPS resin and, accordingly, is not preferable.

A period of time for acid treatment is preferably one in which a reaction between a PPS resin and an acid is sufficiently in equilibrium, preferably 2 to 24 hours for treatment at 80° C., preferably 0.01 to 5 hours for treatment at 200° C.

The acid treatment is preferably carried out with the PPS resin sufficiently dipped in an acid or an aqueous solution of an acid. In the acid treatment, a ratio of an acid or an aqueous solution of an acid to the PPS resin is preferably 0.5 to 500 L of an acid or an aqueous solution of an acid with respect to 500 g of the PPS resin, and the lower limit is more preferably 1 L or more, still more preferably 2.5 L or more. The upper limit of the amount of an acid or an aqueous solution of an acid with respect to 500 g of the PPS resin is more preferably 100 L or less, still more preferably 20 L or less. Less than 0.5 L of an acid or an aqueous solution of an acid with respect to 500 g of a PPS resin causes the PPS resin to be insufficiently dipped in the aqueous solution and then be insufficiently washed, increases the metal content of the PPS resin and, accordingly, is not preferable. In addition, more than 500 L of an acid or an aqueous solution of an acid with respect to 500 g of the PPS resin causes the solution amount to be in large excess of the PPS resin, remarkably reduces production efficiency and, accordingly, is not preferable.

An acid treatment such as these is carried out by a method in which a predetermined amount of a PPS resin is loaded into a predetermined amount of water and an acid, and heated and stirred in a pressure vessel, a method in which an acid treatment is continuously carried out or the like. A convenient method of separating an aqueous solution and a PPS resin from a treated solution after acid treatment is filtration with a sieve or a filter, and examples of such methods include natural filtration, pressure filtration, reduced pressure filtration, centrifugal filtration and the like. The PPS resin separated from the treated solution is preferably washed with water or warm water several times to remove acid and impurities remaining on the surface of the PPS resin. A method of washing is, for example, a method of separating an aqueous solution and a PPS resin using a method in which filtration is carried out with water being poured on a PPS resin on a filtration device, a method in which the separated PPS resin is loaded into preliminarily prepared water followed by carrying out filtration again and the like. Water used for washing is preferably distilled water or deionized water. In this way, the acid treated PPS resin is considered to have a varying end structure and the like, and it is difficult for a general formula to represent the structure of a PPS resin obtained by acid treatment. In addition, the acid-treated PPS resin is difficult to identify by its characteristics, and can be identified only by a process of obtaining the PPS resin (acid treatment).

A hot-water step is preferably carried out as in the following manner before an acid treatment step. Water used for hot-water treatment is preferably distilled water or deionized water. A temperature for hot-water treatment is preferably 80 to 250° C., more preferably 120 to 200° C., still more preferably 150 to 200° C. Less than 80° C. causes the hot-water treatment effect to be smaller and increases the generated amount of volatilized gas, and more than 250° C. causes the pressure to be too high and, accordingly, is not preferable from a safety viewpoint.

A period of time for hot-water is preferably one in which an extraction treatment with a PPS resin and hot-water is sufficient, preferably 2 to 24 hours for treatment at 80° C., preferably 0.01 to 5 hours for treatment at 200° C.

The hot-water treatment is preferably carried out with the PPS resin sufficiently dipped in water. A ratio of water to the PPS resin in the hot-water treatment is preferably 0.5 to 500 L of water, more preferably 1 to 100 L, still more preferably 2.5 to 20 L, with respect to 500 g of the PPS resin. Less than 0.5 L of water with respect to 500 g of the PPS resin causes the PPS resin to be insufficiently dipped in water and then be insufficiently washed, increases the generated amount of volatilized gas and, accordingly, is not preferable. In addition, more than 500 L of water with respect to 500 g of the PPS resin causes the water amount to be in large excess of the PPS resin, remarkably reduces production efficiency and, accordingly, is not preferable.

A hot-water treatment operation such as these is not limited to a particular one, but is carried out by a method in which a predetermined amount of a PPS resin is loaded into a predetermined amount of water, and heated and stirred in a pressure vessel, a method in which a hot-water treatment is continuously carried out or the like. A method of separating an aqueous solution and a PPS resin from a treated solution after hot-water treatment is not limited to a particular one, and filtration with a sieve or a filter is convenient. Examples of such methods include natural filtration, pressure filtration, reduced pressure filtration, centrifugal filtration and the like. The PPS resin separated from the treated solution is preferably washed with water or warm water several times to remove impurities remaining on the surface of the PPS resin. A method of washing is not limited to a particular one, and is, for example, a method of separating an aqueous solution and a PPS resin using a method in which filtration is carried out with water being poured on a PPS resin on a filtration device, a method in which the separated PPS resin is loaded into preliminarily prepared water followed by carrying out filtration again and the like. Water used for washing is preferably distilled water or deionized water.

In addition, the decomposition of the end group of PPS during acid treatment or hot-water treatment such as abovementioned is not preferable and, accordingly, the acid treatment or hot-water treatment is desirably carried out under an inert atmosphere. Examples of inert atmospheres include nitrogen, helium, argon and the like, and a nitrogen atmosphere is preferable from the viewpoint of economical efficiency.

Our method may include a step of washing with an organic solvent before an acid treatment step or a hot-water treatment step, and the method of washing is carried out in the following manner. The organic solvent used for washing the PPS resin is not limited to a particular one as long as it does not have an effect of decomposing the PPS resin, and examples thereof include nitrogen-containing polar solvents such as N-methyl-2-pyrrolidone, dimethylformamide, dimethylacetamide, 1,3-dimethylimidazolidinone, hexamethylphosphorous amide and piperazinones, sulfoxide.sulfone solvents such as dimethylsulfoxide, dimethylsulfone, and sulfolane, ketone solvents such as acetone, methyl ethyl ketone, diethyl ketone, and acetophenone, ether solvents such as dimethyl ether, dipropyl ether, dioxane and tetrahydrofuran, halogen solvents such as chloroform, methylene chloride, trichloroethylene, ethylene dichloride, perchloroethylene, monochloroethane, dichloroethane, tetrachloroethane, perchloroethane, and chlorobenzene, alcohol.phenol solvents such as methanol, ethanol, propanol, butanol, pentanol, ethylene glycol, propylene glycol, phenol, cresol, polyethylene glycol, and polypropylene glycol, aromatic hydrocarbon solvents such as benzene, toluene and xylene and the like. Among these organic solvents, N-methyl-2-pyrrolidone, acetone, dimethylformamide, chloroform and the like are particularly preferably used. In addition, these organic solvents are used singly or in mixture of two or more kinds of thereof.

Examples of methods of washing with an organic solvent include a method in which a PPS resin is dipped in an organic solvent, and other methods, and the resulting mixture can be suitably stirred and heated, if necessary. A washing temperature at which a PPS resin is washed with an organic solvent is not limited to a particular value, and any temperature can be selected from room temperature to about 300° C. The washing efficiency is higher as the washing temperature is higher, and a washing temperature of room temperature to 150° C. usually affords a sufficient effect. It is also possible to carry out washing under pressure in a pressure vessel at a temperature equal to or greater than the boiling point of an organic solvent. In addition, the washing time is not limited to a particular value. The washing time depends on the washing conditions, but in washing of a batch type, washing for five minutes or more usually affords a sufficient effect. Continuous washing is also possible.

These acid treatment, hot-water treatment, and organic solvent washing can be carried out in suitable combination.

A PPS resin used may preferably be obtained by carrying out a thermal oxidation treatment after carrying out the above-mentioned acid treatment, hot-water treatment, or organic solvent washing. A thermal oxidation treatment refers to allowing a PPS resin to be treated by heating under an oxygen atmosphere or allowing a PPS resin to which a peroxide such as $H_2O_2$ or a vulcanizing agent such as S has been added to be treated by heating, and heating under an oxygen atmosphere is particularly preferable from the viewpoint of convenience.

A heating device for thermal oxidation treatment of a PPS resin may be a usual hot air dryer, a heating device of a rotary type, or a heating device with agitating blades, and using a heating device of a rotary type or a heating device with agitating blades is more preferable for not only efficient but also more uniform treatment. The oxygen concentration of the atmosphere in thermal oxidation treatment is preferably 1% by volume or more, more preferably 2% by volume or more. The upper limit of the oxygen concentration is preferably 5% by volume or less in order to achieve the effects. Carrying out thermal oxidation treatment at an oxygen concentration of 5% by volume or less prevents the excessive progress of the thermal oxidation treatment and the reduction in the toughness of a molded article containing a thermal oxidation-treated PPS resin. In addition, carrying out thermal oxidation treatment at an oxygen concentration of 1% by volume or more enables the thermal oxidation treatment to be sufficiently carried out, affords a PPS resin having a smaller amount of volatile components and, accordingly, is preferable.

A temperature for thermal oxidation treatment of a PPS resin is preferably 160 to 270° C., more preferably 160 to 230° C. Carrying out thermal oxidation treatment at 270° C. or less prevents the rapid progress of the thermal oxidation treatment and the reduction in the toughness of a molded article containing a thermal oxidation-treated PPS resin and, accordingly, is preferable. In addition, carrying out thermal oxidation treatment at a temperature of 160° C. or more enables the thermal oxidation treatment to progress at a suitable rate, affords a PPS resin having a smaller generated amount of volatile components and, accordingly, is preferable.

A period of time for thermal oxidation treatment is preferably 0.5 to 30 hours, more preferably 0.5 to 25 hours, still more preferably 2 to 20 hours. A treatment time of 0.5 hours or more enables the thermal oxidation treatment to be sufficiently carried out, affords a PPS resin having a smaller amount of volatile components and, accordingly, is preferable. A treatment time of 30 hours or less enables a cross-linking reaction by thermal oxidation treatment to be controlled, prevents the reduction in the toughness of a molded article containing a thermal oxidation-treated PPS resin and, accordingly, is preferable.

A PPS resin suitably has a melt viscosity of 20 Pa·s to 300 Pa·s at 310° C. at a shear rate of 1000/s. A melt viscosity of 30 Pa·s to 250 Pa·s is suitable, and 40 Pa·s to 200 Pa·s is more suitable. At less than 20 Pa·s, there is no expression of water pressure cracking strength, and at more than 300 Pa·s, the formability is reduced. Accordingly, neither is preferable.

The generated amount of gas volatilized from a PPS resin when the PPS resin is heated and melted under vacuum at 320° C. for two hours is more preferably 0.3% by weight or less. A generated gas amount of more than 0.3% by weight may increase the amount of volatile components adhered to a die and a die vent portion and be more likely to cause defective transfer and gas burning and, accordingly, is not preferable. The lower limit of the generated gas amount is not limited to a particular value, but a longer time required for polymer washing and thermal oxidation treatment, which are examples of techniques of reducing the generated gas amount, is economically more disadvantageous.

In this regard, the above-mentioned generated gas amount means the amount of adhesive components resulting from gas volatilized from a PPS resin heated and melted under vacuum and that is cooled and thereby liquefied or solidified, and the amount is measured by allowing a glass ampoule containing a vacuum-encapsulated PPS resin to be heated in a tubular furnace. The glass ampoule has a shape having a 100 mm×25 mm body part, a 255 mm×12 mm neck part, and a 1 mm thickness. In a specific measurement method, only the body part of a glass ampoule containing a vacuum-encapsulated PPS resin is inserted into a tubular furnace at 320° C. and heated for two hours, whereby the volatile gas is cooled by and adheres to the ampoule neck part that is not heated by the tubular furnace. This neck part is cut out and weighed, and then the adhered gas is dissolved in chloroform to be removed. Then, the neck part is dried and weighed again. The generated gas amount is determined from a difference in the weight of the ampoule neck part caused between before and after the gas is removed.

A PPS resin preferably has an ash content of less than 0.25% by weight when ashed at 550° C. A resulting ash content of 0.25% by weight or more means that the PPS resin has not been acid-treated to a sufficient degree and has a large metal content. A larger metal content not only reduces electrical insulating properties but also causes a reduction in melt flowability and a reduction in wet heat resistance and, accordingly, is not preferable. A further preferable ash content range is 0.15% by weight or less, most preferably 0.10% by weight or less.

A PPS resin is preferably such that the PPS resin is dissolved in a 20-fold amount by weight of 1-chloronaphthalene at 250° C. over five minutes, and the resulting solution in a hot state is filtrated under pressure through a PTFE membrane filter having a pore size of 1 μm to afford a residual amount of 4.0% by weight or less. A residual amount of more than 4.0% by weight means that the thermal oxidation cross-linking of the PPS resin progresses excessively, and that gelled matter increases in the resin. The excessive progress of the thermal oxidation cross-linking of the PPS resin reduces the toughness of the PPS resin, reduces the anti-water pressure strength and, accordingly, is not preferable. The lower limit of the residual amount is not limited to a particular value, and is 1.5% by weight or more, preferably 1.7% by weight or more. A residual amount of less than 1.5% by weight causes the degree of thermal oxidation cross-linking to be too minor, accordingly, does not reduce the amount of volatile components very much in melting, and is likely to make the volatile component reduction effect smaller.

In this regard, the above-mentioned residual amount is measured using a sample, a high-temperature filtration device, and a test tube, wherein the sample is a film obtained by pressing a PPS resin to a thickness of about 80 μm, and wherein the test tube is a SUS one having a pneumatic cap and a collection funnel. Specifically, a membrane filter having a pore size of 1 μm is set in a SUS test tube, and then, the PPS resin pressed and made into a film having a thickness of about 80 μm and a 20-fold amount by weight of 1-chloronaphthalene are weighed and sealed in the test tube. This sample is set in a 250° C. high-temperature filtration device and shaken with heating for five minutes. Then, a syringe containing air is connected to the pneumatic cap, the piston of the syringe is pressed, and the sample in a hot state is pneumatically filtrated. A specific method of quantitating the residual amount is such that a difference in weight between the membrane filter before filtration and the membrane filter dried in vacuo at 150° C. for one hour after filtration is determined.

A PPS resin preferably has an exothermic peak temperature (Tmc) of more than 225° C., wherein the exothermic peak temperature is observed during a crystallization caused when the PPS resin is melted by heating to 340° C. and then cooled at a rate of 20° C./minute, using a differential scanning calorimeter. An exothermic peak temperature (Tmc) of 225° C. or less reduces the reactivity of the PPS resin and, accordingly, fails to afford a molded article having excellent mechanical strength.

A glass fiber (B) essentially needs to be blended in an amount of 10 to 100 parts by weight with respect to 100 parts by weight of a polyphenylene sulfide resin. The lower limit of the blended amount of (B) the glass fiber is suitably 20 parts by weight or more, more suitably 30 parts by weight or more. A blended amount of less than 10 parts by weight does not allow the mechanical strength to be sufficiently expressed, and more than 100 parts by weight reduces the water pressure cracking strength. Accordingly, neither is preferable. The upper limit of the blended amount of (B) the glass fiber is preferably 90 parts by weight or less.

To obtain better mechanical strength, (B) a glass fiber is suitably used after it is preliminarily treated with a surface treating agent containing an isocyanate-based compound, an organic silane-based compound, an organic titanate-based compound, an organic borane-based compound, an epoxy compound and/or the like. Among others, a surface treating agent containing an epoxy compound is more suitable. In the light of making it possible to enhance the water pressure cracking strength of a molded article composed of the obtained resin composition, a surface treating agent containing an o-cresol novolac epoxy resin and a bisphenol A epoxy resin is more suitable.

An amino group-containing alkoxysilane compound (c) essentially needs to be blended in an amount of 0.1 to 10 parts by weight with respect to 100 parts by weight of a polyphenylene sulfide resin. The blended amount of (c) the amino group-containing alkoxysilane compound is suitably 0.2 parts by weight or more, more suitably 0.3 parts by weight or more. The upper limit of the blended amount of (c) the amino group-containing alkoxysilane compound is suitably 5 parts by weight or less, more suitably 3 parts by weight or less. A blended amount of less than 0.1 parts by weight does not allow the water pressure cracking strength to be sufficiently expressed, and more than 10 parts by weight reduces the formability. Accordingly, neither is preferable.

Examples of (c) amino group-containing alkoxysilane compounds include γ-(2-aminoethyl)aminopropylmethyldimethoxysilane, γ-(2-aminoethyl)aminopropyltrimethoxysilane, γ-aminopropyltrimethoxysilane, γ-aminopropyltriethoxysilane and the like. Among others, γ-aminopropyltriethoxysilane is particularly suitable in the light of obtaining excellent water pressure cracking strength.

It is important that a PPS resin composition has an exothermic peak temperature (Tmc) of 195° C. to 225° C., wherein the exothermic peak temperature is observed during a crystallization caused when the PPS resin composition is melted for five minutes by heating to 340° C. and then cooled at a rate of 20° C./minute, using a differential scanning calorimeter. The exothermic peak temperature is more suitably 200° C. or more, still more suitably 205° C. or more. The upper limit of Tmc is more suitably less than 220° C., still more suitably 215° C. or less. A Tmc of lower than 195° C. does not allow the spherulite size to be uniform and causes the molded article to be fragile, and a Tmc of higher than 225° C. means that the reaction between the acid-treated PPS resin and an amino group-containing silane coupling agent is not sufficient. Consequently, a molded article having excellent mechanical strength cannot be obtained.

A PPS resin composition may be blended with an inorganic filler other than a glass fiber to the extent that the desired effects are not impaired. Specific examples of such inorganic fillers to be used include: fibrous fillers such as carbon fibers, carbon nanotubes, carbon nanohorns, potassium titanate whiskers, zinc oxide whiskers, calcium carbonate whiskers, wollastonite whiskers, aluminium borate whiskers, aramid fibers, alumina fibers, silicon carbide fibers, ceramic fibers, asbestos fibers, gypsum fibers, and metal fibers; fullerene; silicates such as talc, wollastonite, zeolite, sericite, mica, kaolin, clay, pyrophyllite, silica, bentonite, asbestos, and alumina silicate; metal compounds such as silicon oxide, magnesium oxide, alumina, zirconium oxide, titanium oxide, and iron oxide; carbonates such as calcium carbonate, magnesium carbonate, and dolomite; sulfates such as calcium sulfate and barium sulfate; hydroxides such as calcium hydroxide, magnesium hydroxide, and aluminium hydroxide; non-fibrous fillers such as glass beads, glass flakes, glass powders, ceramic beads, boron nitride, silicon carbide, carbon black, silica, and graphite. Among these, silica and calcium carbonate are preferable. In addition, these inorganic fillers may be hollow and, furthermore, can be used in combination of two or more kinds thereof. These inorganic fillers may also be used after they are preliminarily treated with a coupling agent such as an isocyanate-based compound, an organic silane-based compound, an organic titanate-based compound, an organic borane-based compound, an epoxy compound and/or the like.

In addition, a PPS resin composition may be further blended with another resin to the extent that the desired effects are not impaired. Specific examples of such resins that can be blended include, but are not limited particularly to: polyester resins such as polyethylene terephthalate, polybutylene terephthalate, polycyclohexyldimethylene terephthalate, and polynaphthalene terephthalate; polyethylene, polypropylene, polytetrafluoroethylene, polyetherester elastomer, polyetheramide elastomer, polyamide imide, polyacetal, polyimide, polyether imide, polyether sulfone, polysulfone resins, polyallylsulfone resins, polyketone resins, polyalylate resins, liquid crystal polymers, polythioether ketone resins, polyamide imide resins, polytetrafluoroethylene resins and the like.

In addition, a component other than above-mentioned may be added to a PPS resin composition to the extent that the desired effects are not impaired. Examples of such components include: antioxidants; heat stabilizers (hydroquinone-based); weathering agents (resorcinol-based, salicylate-based, benzotriazole-based, benzophenone-based, hindered amine-based and the like); mold release agents and lubricants (stearyl alcohol, stearamide, bis-urea, and polyethylene wax and the like); pigments (cadmium sulfide, phthalocyanine, carbon black for coloring and the like); dyes (nigrosin and the like); plasticizers (octyl p-oxybenzoate, N-butylbenzene sulfone amide and the like); antistatic agents (alkylsulfate type anionic antistatic agents, quarternary ammonium salt type cationic antistatic agents, nonionic antistatic agents such as polyoxyethylene sorbitan monostearate, betaine-based amphoteric antistatic agents and the like); flame retardants (for example, red phosphorus, phosphate ester, melamine cyanurate, hydroxides such as magnesium hydroxide and aluminium hydroxide, polyammonium phosphate, brominated polystyrene, brominated polyphenylene ethers, brominated polycarbonate, brominated epoxy resins, combinations of such a bromine-based flame retardant and antimony trioxide and the like); heat stabilizers; lubricants such as calcium stearate, aluminum stearate, and lithium stearate; strength improvers such as bisphenol epoxy resins such as bisphenol A resins, novolac phenolepoxy resins, and o-cresol novolac epoxy resins; and usual additives such as anti-ultraviolet agents, coloring agents, flame retardants, and foaming agents.

Methods of producing the PPS resin composition are not limited to particular ones, and representative examples of such methods include a method in which raw materials are mixed, supplied into a commonly known melt-mixer such as a single screw or twin screw extruder, a banbury mixer, a kneader, or a mixing roll, and kneaded.

Among others, a method in which a twin screw extruder having a screw length L (mm) and a screw diameter D (mm) is used for melt kneading is suitable, wherein the ratio of L/D is 10 or more and 100 or less. An L/D ratio of 20 or more and 100 or less is more suitable, and an L/D ratio of 30 or more and 100 or less is still more suitable.

A melt kneading energy used in melt-kneading the PPS resin composition using a twin screw extruder is suitably 0.10 kWh/kg to 0.5 kWh/kg. The lower limit of the melt kneading energy is more preferably 0.12 kWh/kg or more, more preferably 0.15 kWh/kg or more. The upper limit of the melt kneading energy is more preferably 0.40 kWh/kg or less, more preferably 0.20 kWh/kg or less. A melt kneading energy of lower than 0.10 kWh/kg is not preferable because it causes the melt kneading to be insufficient, and not only fails to allow excellent water pressure cracking strength to be expressed but also reduces formability. In addition, a melt kneading energy of higher than 0.5 kWh/kg is not preferable because it not only makes it difficult to control the resin temperature but also increases undesirable decomposition reaction, and rather reduces water pressure cracking strength.

A melt kneading energy is a value per unit extrusion mass, wherein the value shows a workload applied to a raw material using an extruder and can be represented by Equation (1), wherein A represents a screw rotational speed (rpm) of the twin screw extruder during melt kneading; B represents the maximum screw rotational speed (rpm) of the twin screw extruder; C represents a screw driving motor output (kW) during melt kneading; and F represents an extrusion rate (kg/h) of the melted resin during melt kneading. In Equation (1), E represents a melt kneading energy.

$$E=\{(A/B)\times C\}/F \qquad (1)$$

B is a parameter related to the performance of the twin screw extruder, but C is a parameter that can vary with the constituting screw arrangement. To provide a melt kneading energy in a desired range, for example, the full screw length L preferably encompasses a kneading zone having at least three or more blocks, and 40% or more of the whole screw length L is preferably constituted by the kneading blocks.

In addition, the PPS resin composition is melt-kneaded in a twin screw extruder, and is continuously discharged and collected through a die, and a preferable method is exemplified in which the temperature of the resin that has just been discharged through the outlet of the die (hereinafter may be referred to as a die outlet resin temperature) is controlled to more than 340° C. and 430° C. or less. A die outlet resin temperature of 340° C. or less does not allow the reaction with the PPS resin, the glass fiber, and the amino group-containing silane coupling agent to progress sufficiently and makes it difficult to express excellent water pressure cracking strength. In addition, a die outlet resin temperature of more than 430° C. not only causes functional groups in the PPS resin and the sizing agent in the glass fiber to be both decomposed but also promotes the distribution of the amino group-containing silane coupling agent into the gas phase and, as a result, such a temperature does not allow the reaction with the PPS resin, the glass fiber, and the amino group-containing silane coupling agent to progress sufficiently and makes it difficult to express excellent water pressure cracking strength. A method of controlling the die outlet resin temperature to more than 340° C. and 430° C. or less is not limited to a particular one, but a method in which the cylinder temperature is increased or reduced is convenient and suitable. As an example, a technique in which the cylinder temperature is reduced can be used so that the resin temperature which is more than 430° C. can be reduced and controlled to more than 340° C. and 430° C. or less, but reducing the temperature too much may increase shear heating and rather increase the resin temperature. As a more preferable method of reducing the resin temperature, a method in which the cylinder temperature is reduced in the zone constituted of the screws to convey the resin rather than in the kneading zone can be exemplified. On the other hand, a technique in which the cylinder temperature is increased can be used so that the resin temperature which is 340° C.

or less can be increased and controlled to more than 340° C. and 430° C. or less, but increasing the temperature too much may reduce shear heating and rather reduce the resin temperature. As a more preferable method of increasing the resin temperature, a method in which the cylinder temperature is increased in the zone constituted by the screws for conveying the resin rather than in the kneading zone can be exemplified. The lower limit of a more preferable range of the die outlet resin temperature for a twin screw extruder is preferably more than 380° C., more preferably 400° C. or more. An example of the upper limit is 430° C. or less, and a more preferable range is 420° C. or less. In this regard, the die outlet resin temperature mentioned here is a value measured using a contact type resin temperature thermometer directly inserted into a die hole.

A method of supplying raw materials in producing the PPS resin composition by melt kneading is not limited to a particular one, but the method preferably includes: pre-blending 1 to 20 parts by weight out of the 100 parts by weight of (A) an acid-treated polyphenylene sulfide resin and 0.1 to 10 parts by weight of (C) an amino group-containing alkoxysilane compound to form (D) an alkoxysilane compound pre-blended mixture; and supplying the extruder with (D) through the main hopper of the extruder separately from the remaining 99 to 80 parts by weight of (A) the acid-treated polyphenylene sulfide resin. Part of (A) the acid-treated polyphenylene sulfide resin and (C) the amino group-containing alkoxysilane compound are pre-blended to form (D) the alkoxysilane compound pre-blended mixture, and (D) is supplied into the extruder separately from the remaining (A) acid-treated polyphenylene sulfide resin, whereby (A) the acid-treated polyphenylene sulfide resin and (C) the amino group-containing alkoxysilane compound are brought into contact in a state in which the concentration of (C) the amino group-containing alkoxysilane compound is high. Thus, the reaction speed is increased, the reaction progresses efficiently, and thus excellent pressure resistant strength and an excellent flash suppression effect can be expressed. In this example, the effects are smaller if part of (A) the acid-treated polyphenylene sulfide resin and (C) the amino group-containing alkoxysilane compound are pre-blended to form (D) the alkoxysilane compound pre-blended mixture, but if (D) and the remaining (A) acid-treated polyphenylene sulfide resin are mixed when (D) is supplied into the extruder. The effects are also smaller if part of (A) the acid-treated polyphenylene sulfide resin and (C) the amino group-containing alkoxysilane compound are pre-blended to form (D) the alkoxysilane compound pre-blended mixture, but if (D) the alkoxysilane compound pre-blended mixture and the remaining (A) acid-treated polyphenylene sulfide resin are supplied together using the same supplying device.

Another example of a more preferable method of supplying a raw material is a method in which part of (A) the acid-treated polyphenylene sulfide resin and (C) the amino group-containing alkoxysilane compound are pre-blended to form (D) the alkoxysilane compound pre-blended mixture, and (D) is supplied into the most upstream portion of the extruder while the remaining (A) acid-treated polyphenylene sulfide resin is being supplied separately into the more downstream portion on a side of the extruder. In this manner, (A) the acid-treated polyphenylene sulfide resin and (C) the amino group-containing alkoxysilane compound are brought into contact in a state in which the concentration of (C) the amino group-containing alkoxysilane compound is high. Thus, the reaction rate is increased, the reaction is promoted efficiently, and thus excellent pressure resistant strength and an excellent flash suppression effect can be expressed. The supply position of the remaining (A) acid treatment polyphenylene sulfide resin is not limited to a particular one, but it is preferable that the supply position is more upstream than the midpoint addition inlet through which (B) the glass fiber is supplied, and a preferable example is a supply position at or about the midpoint of the screw length.

The PPS resin composition thus obtained can serve various moldings such as injection molding, extrusion molding, blow molding, and transfer molding, and is particularly suitable for injection molding applications.

A PPS resin composition has excellent water pressure cracking strength (anti-water pressure strength) and, accordingly, can be applied to piping parts used for portions where high-temperature liquid flows and where a large hydraulic pressure similar to the direct supply pressure of tap water or a large hydraulic pressure caused by water hammer is applied and, in addition, portions where higher-temperature liquid flows. Piping parts are any of fittings, valves, servos, sensors, pipes, and pumps, and are preferably used for water heater parts in particular. In conventional decompression type water heaters, piping parts with which high-temperature water comes in contact are free from receiving a large hydraulic pressure, and for the parts, piping parts composed of conventional PPS resin compositions can be used, but decompression type water heaters have a problem, for example, in that tapping from a plurality of faucets all at once decreases the hydraulic pressure. On the other hand, in direct water supply pressure type water heaters for which the hydraulic pressure and hot water temperature unevenness of hot water during tapping have been improved, high-temperature liquid at a high hydraulic pressure comes in contact with the piping parts and, accordingly, for such heaters, piping parts composed of conventional PPS resin compositions cannot be used. Piping parts composed of the PPS resin composition can be applied to direct water supply pressure type water heaters whose piping parts come in contact with 70° C. or hotter liquid having a pressure of 0.3 MPa or more. In addition, piping parts composed of the PPS resin composition can be used as piping parts in screw shape in the light of enhancing tightening torque strength.

A liquid flowing in piping parts may be not only water but also an antifreezing liquid containing alcohol, glycol, glycerin or the like, and the kind and concentration thereof are not limited to particular ones.

In addition, the PPS resin composition can be applied to piping parts to be exposed to a low hydraulic pressure load, such as water supply faucets, liquid pump casing parts, and mixing faucets, and to water plumbing parts such as tap water meter parts that are exposed to a high hydraulic pressure load but not to a high-temperature water flow.

In addition, a PPS resin composition conforms to the Regulation of ACS: Attestation de Conformité Sanitaire of France (a ministerial ordinance of the French Ministry of Social Affairs and Health) and, accordingly, can be applied to water supply materials and equipment in France. For the composition to be accredited by the Regulation of ACS, all the raw materials constituting the resin composition need to be registered in the positive list prescribed in ACS. Furthermore, not only if the composition requirements are satisfied but also if the results of a leaching test carried out using a molded article satisfy the criteria prescribed in ACS, the composition can then be accredited.

As above-mentioned, piping parts composed of the PPS resin composition have excellent water pressure cracking strength and wet heat resistance and, accordingly, can be used for parts that are exposed to a high-temperature liquid flow and a large hydraulic pressure similar to the direct supply pressure of tap water.

The water pressure cracking strength (anti-water pressure strength) and wet heat resistance of a molded article formed from the PPS resin composition can be measured by the following method. Pellets composed of the PPS resin composition are supplied into an injection molding machine (SE100DU) made by Sumitomo Heavy Industries, Ltd. which is set to a cylinder temperature of 305° C. and a die temperature of 130° C., and the pellets are filled in the machine in a filling time of 1 s, and injection-molded with the pressure dwelling at 50% of the filling pressure to obtain a T-shaped pipe type fitting test piece having an outside diameter of 21.7 mm and a thickness of 2.8 mm as prescribed in JIS G3452. One end of this test piece is connected to a rubber pipe connected to a pump (T-300N) made by Kyowa, another end is closed, and the other end is connected to a ball valve. With the ball valve opened, water is passed through the test piece, and the ball valve is closed after the air is removed from the inside of the test piece. A hydraulic pressure is applied using a pump, and a pressure indicated by the pressure gauge when the test piece is broken is regarded as an anti-water pressure strength. Then, one end of this test piece is connected to a metal pipe connected to a pump (T-100K) made by Kyowa, and the other two ends are connected to a stopper and a ball valve. With the ball valve opened, water is passed through the test piece, and the ball valve is closed after the air is removed from the inside of the test piece. The test piece was dipped in 95° C. warm water and had an internal hydraulic pressure of 0.5 MPa applied for 1000 hours, the T-shaped type fitting test piece was taken out of the hot-water, the ball valve was opened to release the hydraulic pressure, and water is passed through the test piece, which is thus checked for water leakage.

A T-shaped pipe type fitting made using the PPS resin is enabled to have a water pressure cracking strength of 7 MPa or more, wherein the water pressure cracking strength is measured using a test piece free from water leakage. Furthermore, a molded article having a water pressure cracking strength of preferably 7.5 MPa or more, particularly preferably 8.0 MPa or more, can be obtained. A molded article having a water pressure cracking strength of 7 MPa or less as measured by this method has poorer durability and difficult to use in a hot-water environment.

Examples of other applications for which a molded article composed of the PPS resin composition can be used include: electrical and electronic components represented by sensors, LED lamps, connectors for consumer use, sockets, resistors, relay cases, switches, coil bobbins, capacitors, variable capacitor cases, radiators, various terminal blocks, transformers, plugs, printed boards, tuners, speakers, microphones, headphones, small motors, magnetic head bases, semiconductors, liquid crystals, FDD carriages, FDD chassis, motor brush holders, parabolic antennas, computer related parts and the like; and household and business electrical product parts represented by VTR parts, television parts, irons, hair dryers, rice cooker parts, microwave oven parts, acoustic parts, audio equipment parts such as audio/laser discs (registered trademark) and compact discs, lighting parts, refrigerator parts, air-conditioner parts, typewriter parts, word processor parts and the like. Examples of other various applications include: machine related parts represented by office computer related parts, telephone related parts, facsimile related parts, copier related parts, jigs for washing, motor parts, lighters, typewriters and the like; optical equipment and precision machine related parts represented by microscopes, binoculars, cameras, watches and the like; and automobile and vehicle related parts such as valve alternator terminals, alternator connectors, IC regulators, potentiometer bases for light dimmers, various valves such as exhaust gas valves, various fuel related/exhaust system/inlet system pipes, air intake nozzle snorkels, intake manifolds, fuel pumps, engine cooling water joints, carburetor main bodies, carburetor spacers, exhaust gas sensors, cooling water sensors, oil temperature sensors, throttle position sensors, crank shaft position sensors, air flowmeters, brake pad wear sensors, thermostat bases for air-conditioners, heater warm air flow control valves, brush holders for radiator motors, water pump impellers, turbine vanes, wiper motor related parts, distributors, starter switches, starter relays, wire harness for transmissions, window washer nozzles, air-conditioner panel switch boards, coils for fuel related electromagnetic valves, connectors for fuses, horn terminals, electrical part insulating plates, step motor rotors, lamp sockets, lamp reflectors, lamp housings, brake pistons, solenoid bobbins, engine oil filters, ignition device cases, vehicle speed sensors, and cable liners.

In addition, a molded article composed of the composition has excellent water pressure cracking strength and, accordingly, is suitable for water plumbing parts such as toilet heater related parts, water heater related parts, bath related parts, pump related parts, and water meter related parts. Specific examples thereof include water tap stem washers, mixing faucets, mixing valves, pump parts, pipe joints, fittings (elbows, tees, and sockets), water amount control valves, reducing valves, relief valves, solenoid valves, 3-way valves, thermo valves, hot water temperature sensors, water amount sensors, bathtub adapters, water meter housings and the like.

EXAMPLES

Below, our compositions, articles and methods will be more specifically described with reference to Examples, but this disclosure is not to be limited to the description of the Examples.

Method of Evaluating PPS Resin Produced in Reference Examples (1) Melt Flow Rate (MFR)

The MFR of a PPS resin was measured at a measurement temperature of 315.5° C. at a load of 5000 g by the method in accordance with ASTM-D1238-70.

(2) Ash Content

A sample (a PPS resin) precisely weighed out in an amount of 5 g was put into a crucible preheated at 550° C., the crucible was placed in an electric oven at 550° C. for 24 hours, and the sample was ashed. The amount of the ash remaining in the crucible was precisely weighed out, and a ratio of the remaining ash amount to the amount of the sample present before being ashed was regarded as an ash content (% by weight).

Reference Example 1 Preparation of PPS-1

A 70-liter autoclave equipped with a stirrer and a bottom stop valve was charged with 8.27 kg (70.00 mol) of 47.5% sodium hydrosulfide, 2.94 kg (70.63 mol) of 96% sodium hydroxide, 11.45 g (115.50 mol) of N-methyl-2-pyrrolidone (NMP), 1.89 g (23.1 mol) of sodium acetate, and 5.50 kg of ion-exchanged water, the resulting mixture was gradually heated to 245° C. over about three hours with nitrogen passing under normal pressure through the autoclave, and after 9.77 kg of water and 0.28 kg of NMP were distilled out, the reaction vessel was cooled to 200° C. The amount of the water remaining in the system was 1.06 mol, containing the amount of water consumed for hydrolysis of NMP, with respect to 1 mol of the charged alkali metal sulfide. In addition, the amount of scattered hydrogen sulfide was 0.02 mol with respect to 1 mol of the charged alkali metal sulfide.

Then, the resulting mixture was cooled to 200° C., 10.42 kg (70.86 mol) of p-dichlorobenzene and 9.37 kg (94.50 mol) of NMP were added to the mixture, the reaction vessel was sealed with nitrogen gas inside, and the resulting mixture was heated from 200° C. to 270° C. at a rate of 0.6° C./minute with stirring at 240 rpm and allowed to react at 270° C. for 140 minutes. Then, the resulting mixture was cooled from 270° C. to 250° C. over 15 minutes, and 2.40 kg (133 mol) of water was forced into the resulting mixture. Then, the resulting mixture was gradually cooled from 250° C. to 220° C. over 75 minutes and rapidly cooled to the vicinity of room temperature, and the content was taken out.

The content was diluted with about 35 liters of NMP to form a slurry, which was stirred at 85° C. for 30 minutes, and the slurry was filtered through a metal gauze having a mesh size of 80 (an aperture of 0.175 mm) to obtain a solid. Similarly, the obtained solid was washed and filtrated with about 35 liters of NMP. The following operation was repeated three times in total: the obtained solid was diluted with 70 liters of ion-exchanged water, and the resulting mixture was stirred at 70° C. for 30 minutes, and then filtrated through a metal gauze having a mesh size of 80 to collect a solid. The obtained solid and 32 g of acetic acid were diluted with 70 liters of ion-exchanged water, and the resulting mixture was stirred at 70° C. for 30 minutes, and then filtrated through a metal gauze having a mesh size of 80. The obtained solid was further diluted with 70 liters of ion-exchanged water, and the resulting mixture was stirred at 70° C. for 30 minutes, and then filtrated through a metal gauze having a mesh size of 80 to collect a solid. The solid thus obtained was dried at 120° C. under a nitrogen gas stream to thereby obtain a dried PPS.

The obtained PPS had an MFR of 300 g/10 minutes, a Tmc of 228° C., and an ash content of 0.04% by weight.

Reference Example 2 Preparation of PPS-2

A 70-liter autoclave equipped with a stirrer and a bottom stop valve was charged with 8.27 kg (70.00 mol) of 47.5% sodium hydrosulfide, 2.91 kg (69.80 mol) of 96% sodium hydroxide, 11.45 g (115.50 mol) of N-methyl-2-pyrrolidone (NMP), 1.89 g (23.10 mol) of sodium acetate, and 10.5 kg of ion-exchanged water, and the resulting mixture was gradually heated to 245° C. over about three hours with nitrogen passing under normal pressure through the autoclave, and after 14.78 kg of water and 0.28 kg of NMP were distilled out, the reaction vessel was cooled to 200° C. The amount of the water remaining in the system was 1.06 mol, containing the amount of water consumed for hydrolysis of NMP, with respect to 1 mol of the charged alkali metal sulfide. In addition, the amount of scattered hydrogen sulfide was 0.02 mol with respect to 1 mol of the charged alkali metal sulfide.

Then, the resulting mixture was cooled to 200° C., 10.45 kg (71.07 mol) of p-dichlorobenzene and 9.37 kg (94.50 mol) of NMP were added to the mixture, the reaction vessel was sealed with nitrogen gas inside, and the resulting mixture was heated from 200° C. to 270° C. at a rate of 0.6° C./minute with stirring at 240 rpm. After the resulting mixture was allowed to react at 270° C. for 100 minutes, the bottom stop valve of the autoclave was opened, and the content was flushed under pressurized nitrogen into a vessel with a stirrer over 15 minutes, and stirred at 250° C. for a while to remove most of the NMP.

The obtained solid and 76 liters of ion-exchanged water were put into an autoclave with a stirrer, and the solid was washed at 70° C. for 30 minutes, and then filtrated by suction through a glass filter. Then, 76 liters of ion-exchanged water heated to 70° C. was poured onto a glass filter, and the solid was filtrated by suction to obtain a cake.

The obtained cake and 90 liters of ion-exchanged water were put into an autoclave with a stirrer, and acetic acid was added so that the solid could have a pH of 7. The autoclave was purged with nitrogen, heated to 192° C., and maintained for 30 minutes. Then, the autoclave was cooled, and the content was taken out.

The content was filtrated by suction through a glass filter, 76 liters of ion-exchanged water of 70° C. was then poured onto this, and the content was filtrated by suction to obtain a cake. The obtained cake was dried at 120° C. under a nitrogen gas stream to thereby obtain a dried PPS, which underwent thermal oxidation treatment at an oxygen concentration of 2% at 215° C. for 12 hours. The obtained PPS had an MFR of 400 g/10 minutes, a Tmc of 226° C., and an ash content of 0.15% by weight.

Reference Example 3 Preparation of PPS-3

A reactant obtained by the same preliminary process/ polymerization reaction process/collection process as in Reference Example 1 was diluted with 35 liters of NMP, the solvent and the solid were filtrated through a sieve (a metal gauze having a mesh size of 80), and the obtained solid was washed and filtrated with 35 liters of NMP in the same manner. The following operation was repeated three times in total: the obtained solid was diluted with 70 liters of ion-exchanged water, and the resulting mixture was stirred at 70° C. for 30 minutes, and then filtrated through a metal gauze having a mesh size of 80 to collect a solid. The obtained solid was diluted with 70 liters of a 0.05% by weight calcium acetate aqueous solution, and the resulting mixture was stirred at 70° C. for 30 minutes, and then filtrated through a metal gauze having a mesh size of 80. The obtained solid was further diluted with 70 liters of ion-exchanged water, and the resulting mixture was stirred at 70° C. for 30 minutes, and then filtrated through a metal gauze having a mesh size of 80 to collect a solid. The solid thus obtained was dried at 120° C. under a nitrogen gas stream to thereby obtain a dried PPS resin.

The obtained PPS had an MFR of 150 g/10 minutes, a Tmc of 198° C., and an ash content of 0.25%.

(B) Glass Fiber (GF)

B-1: Chopped Strand A (a glass fiber surface-treated with a bisphenol A epoxy resin and an o-cresol novolac epoxy resin and having a length of 3 mm and an average fiber diameter of 10.5 μm)

B-2: Chopped Strand B (a glass fiber surface-treated with an o-cresol novolac epoxy resin and having a length of 3 mm and an average fiber diameter of 10.5 μm)

(C) Amino Group-containing Alkoxysilane Compound

C-1: γ-aminopropyltriethoxysilane

C'-2: 2-(3,4-epoxycyclohexyl)ethyltrimethoxysilane (D) Alkoxysilane Compound Pre-Blended Mixture D-1: Alkoxysilane Compound Pre-blended Mixture obtained by dry-blending 9 parts by weight of PPS-1 and 1 part by weight of C-1

Measurement Evaluation Method

The measurement evaluation methods in Examples and Comparative Examples herein are as below-mentioned.

Measurement of Cooling Crystallization Temperature

From the pellets of the PPS resin composition, about 10 mg of them was taken as a sample. Using a differential scanning calorimeter, DSC-7, made by Perkin Elmer Co., Ltd., the sample was heated at a heating rate of 20° C./minute, maintained at 340° C. for five minutes, and cooled at a rate of 20° C./minute. A crystallization peak (exothermic peak) temperature thus indicated was measured and regarded as a cooling crystallization temperature (Tmc (° C.)). The same method was applied to the PPS resins produced in Reference Examples 1 to 3 to determine their cooling crystallization temperatures (Tmc (° C.)).

Measurement of Water Pressure Cracking Strength

The PPS resin composition pellets were supplied into an injection molding machine (SE100DU) made by Sumitomo Heavy Industries, Ltd. which was set to a cylinder temperature of 305° C. and a die temperature of 130° C., and the pellets were filled in the machine in a filling time of 1 s, and injection-molded with the pressure dwelling at 50% of the filling pressure to obtain a T-shaped pipe type fitting test piece having an outside diameter of 21.7 mm and a thickness of 2.8 mm as prescribed in JIS G3452. One end of this test piece was connected to a rubber pipe connected to a pump (T-300N) made by Kyowa, another end was closed, and the other end was connected to a ball valve. With the ball valve opened, water was passed through the test piece, and the ball valve was closed after the air was removed from the inside of the test piece. A hydraulic pressure was applied using a pump, and a pressure indicated by the pressure gauge when the test piece was broken was regarded as a water pressure cracking strength (unit: MPa).

10 μm Flash Length

Using an injection molding machine, "SE-30D", made by Sumitomo Heavy Industries, Ltd., injection molding was carried out under the temperature conditions at a molding temperature of 330° C. and a die temperature of 130° C. with a disc-shaped die, 40 mm in diameter×3 mm in thickness, having eight protrusions on the circumference thereof: (a) 5 mm in width×20 mm in length×1000 μm in thickness, (b) 5 mm in width×20 mm in length×700 μm in thickness, (c) 5 mm in width×20 mm in length×500 μm in thickness, (d) 5 mm in width×20 mm in length×300 μm in thickness, (e) 5 mm in width×20 mm in length×100 μm in thickness, (f) 5 mm in width×20 mm in length×50 μm in thickness, (g) 5 mm in width×20 mm in length×20 μm in thickness, and (h) 5 mm in width×20 mm in length×10 μm in thickness. The filled length of the (h) protrusion measured when the (b) protrusion was filled up to its tip was regarded as a flash length. In this regard, the gate was positioned in the central portion of the disc (a shorter flash length affords better low-flash properties).

Conformity of Resin Composition with ACS

A resin composition whose constituent raw materials were all registered in the positive list prescribed in ACS: Attestation de Conformité Sanitaire of France (a ministerial ordinance of the French Ministry of Social Affairs and Health) was rated A, otherwise B. A resin composition cannot be accredited by ACS if at least one of its raw materials is not registered in the positive list.

Examples 1 to 2 and 4 to 5, Comparative Examples 1 to 5

Using a twin screw extruder (TEM-58BS, made by Toshiba Machine Co., Ltd., having the highest screw rotational speed of 518 rpm) having a screw length L of 2500 mm and a screw diameter D of 58 mm at an L/D ratio of 43 and having a midpoint addition inlet, (A) a PPS resin and (C) an alkoxysilane compound which were dry-blended at a weight ratio shown in Tables 1 and 2 were supplied through the most upstream raw material supply inlet of the extruder and allowed to be molten, and (B) a glass fiber at a weight ratio shown in Table 1 was supplied through the midpoint addition inlet. The resulting mixture was melt-kneaded at a screw rotational speed (rpm) and an extrusion rate (kg/h) shown in Tables 1 and 2 with the cylinder temperature regulated so that the die outlet resin temperature could be more than 380° C. and 430° C. or less. Pellets were thus obtained. This method, in which (A) the PPS resin and (C) the alkoxysilane compound were dry-blended, and then supplied into the twin screw extruder through the most upstream raw material supply inlet of the extruder, is hereinafter referred to as the method A. Tables 1 and 2 show screw powers (kW) and melt kneading energies (kW·h/kg) in melt kneading. Furthermore, the obtained pellets were used for evaluation of the above-mentioned various characteristics. The results are shown in Tables 1 and 2. In this regard, the above-mentioned die outlet resin temperature was measured using a contact type resin temperature thermometer directly inserted into a die hole.

Example 3

Pellets were obtained by melt kneading in the same manner as in Example 1 except that the cylinder temperature was regulated so that the die outlet resin temperature could be more than 340° C. and 380° C. or less. In addition, the various characteristics were evaluated in the same manner. The results are shown in Table 1.

Examples 6 and 7

Pellets were obtained by melt kneading in the same manner as in Example 1 except that (D) the alkoxysilane compound pre-blended mixture composed of part of (A) the PPS resin and (C) the alkoxysilane compound and the remaining (A) PPS resin were supplied through the most upstream raw material supply inlet of the extruder using separate hoppers as shown in Table 1. This method, in which (D) the alkoxysilane compound pre-blended mixture composed of part of (A) the PPS resin and (C) the alkoxysilane compound and the remaining (A) PPS resin were supplied into the twin screw extruder through the most upstream raw material supply inlet of the extruder using separate hoppers, is hereinafter referred to as the method B. In addition, the various characteristics were evaluated in the same manner. The results are shown in Table 1. In this regard, the amount of (A) the PPS resin blended in the resin composition in each Example is 100 parts by weight including (A) the PPS resin used in preparing (D) the alkoxysilane compound pre-blended mixture.

Examples 8 and 9

Pellets were obtained by melt kneading in the same manner as in Example 1 except that (D) the alkoxysilane compound pre-blended mixture composed of part of (A) the PPS resin and (C) the alkoxysilane compound was supplied through the most upstream raw material supply inlet of the extruder, and the remaining (A) PPS resin was fed through a side inlet downstream of the most upstream inlet and upstream of the midpoint addition inlet for supplying (B) the glass fiber as shown in Table 1. This method, in which (D) the alkoxysilane compound pre-blended mixture composed of part of (A) the PPS resin and (C) the alkoxysilane compound was supplied into the twin screw extruder through the most upstream raw material supply inlet of the extruder, and the remaining (A) PPS resin was fed through a side inlet downstream of the most upstream inlet and upstream of the midpoint addition inlet for supplying (B) the glass fiber, is hereinafter referred to as the method C. In addition, the various characteristics were evaluated in the same manner. The results are shown in Table 1. In this regard, the amount of (A) the PPS resin blended in the resin composition in each Example is 100 parts by weight including (A) the PPS resin used in preparing (D) the alkoxysilane compound pre-blended mixture.

Comparative Example 6

Pellets were obtained by melt kneading in the same manner as in Example 1 except that the cylinder temperature was regulated so that the die outlet resin temperature could be more than 340° C. or less. In addition, the various characteristics were evaluated in the same manner. The results are shown in Table 2.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| (A) PPS | PPS-1 | 100 | 100 | 100 | 100 |  | 91 | 97.3 | 91 | 97.3 |
|  | PPS-2 |  |  |  |  | 100 |  |  |  |  |
|  | PPS-3 |  |  |  |  |  |  |  |  |  |
| (B) Glass Fiber | B-1 | 80 | 80 | 80 |  | 80 | 80 | 80 | 80 | 80 |
|  | B-2 |  |  |  | 80 |  |  |  |  |  |
| (C) Alkoxysilane Compound | C-1 | 1 | 0.3 | 1 | 1 | 1 |  |  |  |  |
|  | C'-2 |  |  |  |  |  |  |  |  |  |
| (D) Alkoxysilane Compound Pre-blended Mixture | D-1 |  |  |  |  |  | 10 | 3 | 10 | 3 |
| Method of Supply to Extruder |  | Method A | Method A | Method A | Method A | Method A | Method B | Method B | Method C | Method C |
| Screw Rotational Speed (rpm) |  | 300 | 300 | 300 | 300 | 300 | 300 | 300 | 300 | 300 |
| Screw Driving Motor Output (kW) |  | 53 | 42 | 59 | 52 | 45 | 60 | 45 | 63 | 48 |
| Extrusion Rate (kg/h) |  | 200 | 200 | 200 | 200 | 200 | 200 | 200 | 200 | 200 |
| Melt Kneading Energy (kw · h/kg) |  | 0.15 | 0.12 | 0.17 | 0.15 | 0.13 | 0.17 | 0.13 | 0.18 | 0.14 |
| Die Outlet Resin Temperature (° C.) |  | 403 | 391 | 375 | 405 | 394 | 410 | 400 | 413 | 405 |
| Tmc (° C.) |  | 205 | 210 | 220 | 207 | 219 | 203 | 208 | 203 | 208 |
| Water Pressure Cracking Strength (MPa) |  | 8.8 | 7.7 | 7.3 | 7.5 | 7.6 | 9.7 | 8.5 | 10.6 | 9.0 |
| 10 μm Flash Length (μm) |  | 100 | 120 | 120 | 100 | 120 | 80 | 100 | 70 | 90 |
| ACS Conformity of Raw Material |  | A | A | A | A | A | A | A | A | A |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| (A) PPS | PPS-1 |  | 100 | 100 | 100 | 100 | 100 |
|  | PPS-2 |  |  |  |  |  |  |
|  | PPS-3 | 100 |  |  |  |  |  |
| (B) Glass Fiber | B-1 | 80 | 80 | 80 | 80 | 80 | 80 |
|  | B-2 |  |  |  |  |  |  |
| (C) Alkoxysilane Compound | C-1 | 1 | 0.08 |  | 1 | 1 | 1 |
|  | C'-2 |  |  | 1 |  |  |  |
| (D) Alkoxysilane Compound Pre-blended Mixture | D-1 |  |  |  |  |  |  |
| Method of Supply to Extruder |  | Method A | Method A | Method A | Method A | Method A | Method A |
| Screw Rotational Speed (rpm) |  | 300 | 300 | 300 | 500 | 150 | 300 |
| Screw Driving Motor Output (kW) |  | 50 | 31 | 51 | 88 | 40 | 20 |
| Extrusion Rate (kg/h) |  | 200 | 200 | 200 | 150 | 300 | 40 |
| Melt Kneading Energy (kw · h/kg) |  | 0.14 | 0.09 | 0.15 | 0.57 | 0.04 | 0.29 |
| Die Outlet Resin Temperature (° C.) |  | 411 | 385 | 405 | 437 | 383 | 335 |
| Tmc (° C.) |  | 194 | 213 | 215 | 226 | 227 | 230 |
| Water Pressure Cracking Strength (MPa) |  | 4.5 | 5.8 | 8.0 | 6.5 | 6.2 | 6.8 |
| 10 μm Flash Length (μm) |  | 140 | 140 | 130 | 130 | 130 | 140 |
| ACS Conformity of Raw Material |  | A | A | B | A | A | A |

The results from the above-mentioned Examples 1 to 9 and Comparative Examples 1 to 6 will be described in comparison.

According to Examples 1 to 9 shown in Table 1, melt kneading was carried out with the amino group-containing alkoxysilane compound added and, in addition, with a specific melt kneading energy applied, and, as a result, the anti-water pressure strength of the obtained molded article was enhanced. In addition, the resin compositions in Examples 1 to 9 have high safety as parts to come in contact with drinking water, and are suitable for piping parts to be exposed to a high hydraulic pressure.

In Comparative Example 1, the PPS resin was not acid-treated, resulting in having a Tmc of lower than 195° C. and poorer anti-water pressure strength.

According to Comparative Example 2, the amino group-containing alkoxysilane compound was added in a smaller amount, the strength enhancement effect was insufficient and, accordingly, the results were that the water pressure cracking strength was poorer, and the flashes were longer.

According to Comparative Example 3, the anti-water pressure strength was higher, but the flashes were longer, 2-(3,4-epoxycyclohexyl)ethyltrimethoxysilane which is an alkoxysilane compound is suspected of causing cancer and, accordingly, this Example is not suitable for water plumbing to come in contact with drinking water and the like.

According to Comparative Example 4, the melt kneading energy was higher and, accordingly, the results were that the Tmc was higher than 225° C., the water pressure cracking strength was poorer, and the flashes were longer.

According to Comparative Example 5, the melt kneading energy was lower and, accordingly, the results were that the Tmc was higher than 225° C., the water pressure cracking strength was poorer, and the flashes were longer.

According to Comparative Example 6, the die outlet resin temperature was lower and, accordingly, the results were that the Tmc was higher than 225° C., the water pressure cracking strength was poorer, and the flashes were longer.

INDUSTRIAL APPLICABILITY

The PPS resin composition has excellent anti-water pressure strength and wet heat resistance and, accordingly, can suitably be used for not only those water supply faucets, liquid pump casing parts, and mixing faucets which are exposed to a lower hydraulic pressure load but also water plumbing parts to be exposed to a large hydraulic pressure similar to the direct supply pressure of tap water or a large hydraulic pressure caused by water hammer, particularly water plumbing parts which come in contact with 70° C. or hotter liquid having a pressure of 0.3 MPa or more.

The invention claimed is:

1. A polyphenylene sulfide resin composition, comprising:
(A) 100 parts by weight of an acid-treated polyphenylene sulfide resin,
(B) 10 to 100 parts by weight of a glass fiber, and
(C) 0.1-10 parts by weight of an amino group-containing alkoxysilane compound; wherein said polyphenylene sulfide resin composition has an exothermic peak temperature (Tmc) of 195° C. to 225° C., said exothermic peak temperature being observed during a crystallization caused when said polyphenylene sulfide resin composition is melted by heating to 340° C. and then cooled at a rate of 20° C./minute, using a differential scanning calorimeter,
wherein said polyphenylene sulfide resin composition is obtained by a production method, wherein a melt kneading energy E (kWh/kg) represented by Equation (1) is 0.1 kWh/kg to 0.5 kWh/kg, said melt kneading energy is used in melt-kneading said polyphenylene sulfide resin composition using a twin screw extruder having a screw length L (mm) and a screw diameter D (mm), the ratio of L/D being 10 or more, and
the temperature of the resin composition at the outlet of a die of said twin screw extruder is more than 380° C. and 430° C. or less;

$$E=\{(A/B) \times C\}/F \quad (1)$$

wherein A represents a screw rotational speed (rpm) of said twin screw extruder during melt kneading;
B represents the maximum screw rotational speed (rpm) of said twin screw extruder;
C represents a screw driving motor output (kW) during melt kneading; and
F represents an extrusion rate (kg/h) of the melted resin during melt kneading.

2. The polyphenylene sulfide resin composition according to claim 1, wherein a surface treating agent for (B) said glass fiber comprises an o-cresol novolac epoxy resin and a bisphenol A epoxy resin.

3. The polyphenylene sulfide resin composition according to claim 1, wherein (C) said amino group-containing alkoxysilane compound is γ-aminopropyltriethoxysilane.

4. A method of producing a polyphenylene sulfide resin composition, wherein the polyphenylene sulfide resin composition comprises (A) 100 parts by weight of an acid-treated polyphenylene sulfide resin, (B) 10 to 100 parts by weight of a glass fiber, and (C) 0.1-10 parts by weight of an amino group-containing alkoxysilane compound, comprising:
a melt kneading energy E (kWh/kg) represented by Equation (1) is 0.1 kWh/kg to 0.5 kWh/kg, said melt kneading energy is used in melt-kneading said polyphenylene sulfide resin composition using a twin screw extruder having a screw length L (mm) and a screw diameter D (mm), the ratio of L/D being 10 or more, and
the temperature of the resin composition at the outlet of a die of said twin screw extruder is more than 380° C. and 430° C. or less, $$E=\{(A/B) \times C\}/F \quad (1)$$

wherein A represents a screw rotational speed (rpm) of said twin screw extruder during melt kneading;
B represents the maximum screw rotational speed (rpm) of said twin screw extruder;
C represents a screw driving motor output (kW) during melt kneading; and
F represents an extrusion rate (kg/h) of the melted resin during melt kneading,
wherein said polyphenylene sulfide resin composition has an exothermic peak temperature (Tmc) of 195° C. to 225° C., said exothermic peak temperature being observed during a crystallization caused when said polyphenylene sulfide resin composition is melted by heating to 340° C. and then cooled at a rate of 20° C./minute, using a differential scanning calorimeter.

5. The method according to claim 4, said method comprising:
pre-blending 1 to 20 parts by weight out of the 100 parts by weight of (A) said acid-treated polyphenylene sulfide resin and 0.1 to 10 parts by weight of (C) said amino group-containing alkoxysilane compound to form (D) an alkoxysilane compound pre-blended mixture, and
supplying the extruder with (D) separately from the remaining 99 to 80 parts by weight of (A) said acid-treated polyphenylene sulfide resin.

6. A molded article comprising said polyphenylene sulfide resin composition according to claim 1.

7. The molded article according to claim 6, wherein said molded article is any water plumbing part selected from the group consisting of toilet heater related parts, water heater related parts, bath related parts, pump related parts, and water meter related parts.

8. The molded article according to claim 7, wherein said water plumbing part conforms to the Regulation of Attestation de Conformité Sanitaire (ACS) of France.

9. The polyphenylene sulfide resin composition according to claim 1, wherein said polyphenylene sulfide resin composition is obtained by the production method comprising:
pre-blending 1 to 20 parts by weight out of the 100 parts by weight of (A) said acid-treated polyphenylene sulfide resin and 0.1 to 10 parts by weight of (C) said amino group-containing alkoxysilane compound to form (D) an alkoxysilane compound pre-blended mixture, and supplying the extruder with (D) separately from the remaining 99 to 80 parts by weight of (A) said acid-treated polyphenylene sulfide resin.

* * * * *